US010355970B2

(12) United States Patent
Mansour

(10) Patent No.: US 10,355,970 B2
(45) Date of Patent: Jul. 16, 2019

(54) DISTRIBUTED PROCEDURE FOR BREADTH-FIRST GRAPH TRAVERSAL ON ASYMMETRIC COMMUNICATION TOPOLOGIES

(71) Applicant: Texas Instruments Incorporated, Dallas, TX (US)

(72) Inventor: Mohamed Farouk Mansour, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 357 days.

(21) Appl. No.: 15/169,074

(22) Filed: May 31, 2016

(65) Prior Publication Data

US 2017/0346715 A1    Nov. 30, 2017

(51) Int. Cl.
*H04L 12/733* (2013.01)
*H04L 12/751* (2013.01)

(52) U.S. Cl.
CPC .............. *H04L 45/02* (2013.01); *H04L 45/20* (2013.01)

(58) Field of Classification Search
CPC .............. A61M 25/0017; A61M 25/04; A61M 39/223; H04L 45/02; H04L 45/20
See application file for complete search history.

(56) References Cited

U.S. PATENT DOCUMENTS

2009/0327372 A1* 12/2009 Ylonen ............... G06F 12/0253

* cited by examiner

*Primary Examiner* — Jung H Park
(74) *Attorney, Agent, or Firm* — Kenneth Liu; Charles A. Brill; Frank D. Cimino

(57) ABSTRACT

The breadth-first search (BFS) starts with a root node. In the first stage, all neighbors of the root node are discovered and added to the nodes frontier. In the following stages, unvisited nodes from the neighbors of the frontier nodes are discovered and added to the frontier. To improve the parallelization of the BFS, the bottom-up search iterates over all unvisited nodes, where each unvisited node searches for its visited neighbors. Communication between nodes and clusters is pipelined with the execution of the BFS.

9 Claims, 4 Drawing Sheets

DISTRIBUTED PROCEDURE FOR BREADTH-FIRST GRAPH TRAVERSAL ON ASYMMETRIC COMMUNICATION TOPOLOGIES

TECHNICAL FIELD OF THE INVENTION

The technical field of this invention is breadth-first graph traversal.

BACKGROUND OF THE INVENTION

Graph traversal is a core operation that is used in many graph processing applications. It involves visiting all nodes in the graph at most once in a particular order. The traversal procedure is typically performed in distinct steps where nodes at a particular level could be discovered in any order. Breadth-First Search (BFS) and Depth-First Search (DFS) are common examples of graph traversal.

Some of the applications of graph traversal are finding all reachable nodes (for garbage collection), finding the best reachable node (single-player game search), finding the best path through a graph (for routing and map directions) or topologically sorting a graph.

SUMMARY OF THE INVENTION

Graph traversal is a commonly used operation. When a distributed processing system is used, the devices must communicate their local bitmaps to all other devices. A method of distributed bottom up graph traversal is shown on asymmetric communication topologies.

BRIEF DESCRIPTION OF THE DRAWINGS

These and other aspects of this invention are illustrated in the drawings, in which.

DETAILED DESCRIPTION OF PREFERRED EMBODIMENTS

The breadth-first search (BFS) starts with a root node. In the first stage, all neighbors of the root node are discovered and added to the nodes frontier. In the following stages, unvisited nodes from the neighbors of the frontier nodes are discovered and added to the frontier. The search iterates until no more nodes could be added to the frontier. To improve the parallelization of the BFS, the bottom-up search iterates over all unvisited nodes, where each unvisited node search for its visited neighbors.

The bottom-up search procedure for breadth-first search proceeds may be implemented as follows:

```
Input: Graph, root
Output: parent array
Mark the root node as visited
While Not all Nodes are Visited
    for every node v in the graph
        if v is not visited
            for every neighbor b of v
                if b is visited
                    mark v as visited
                    set parent[v] = b
                    BREAK
                endif
            endfor
        endif
```

In a shared-memory configuration, this procedure is easy to parallelize and it is efficient when enough nodes are visited. However, it requires knowledge of the status of all neighbor nodes (which becomes a bottleneck in the distributed version of the algorithm).

To prevent multiple visiting of a given node during graph traversal, the node status must be available to all neighbors. A single bit is needed per node to represent visited/unvisited status. Therefore, the whole graph is represented by a binary bitmap where the number of bits equals the number of nodes in the graph. In a distributed configuration, individual devices process disjoint subsets of nodes. Each device holds a local bitmap that holds the status of its local nodes.

Figure 1:
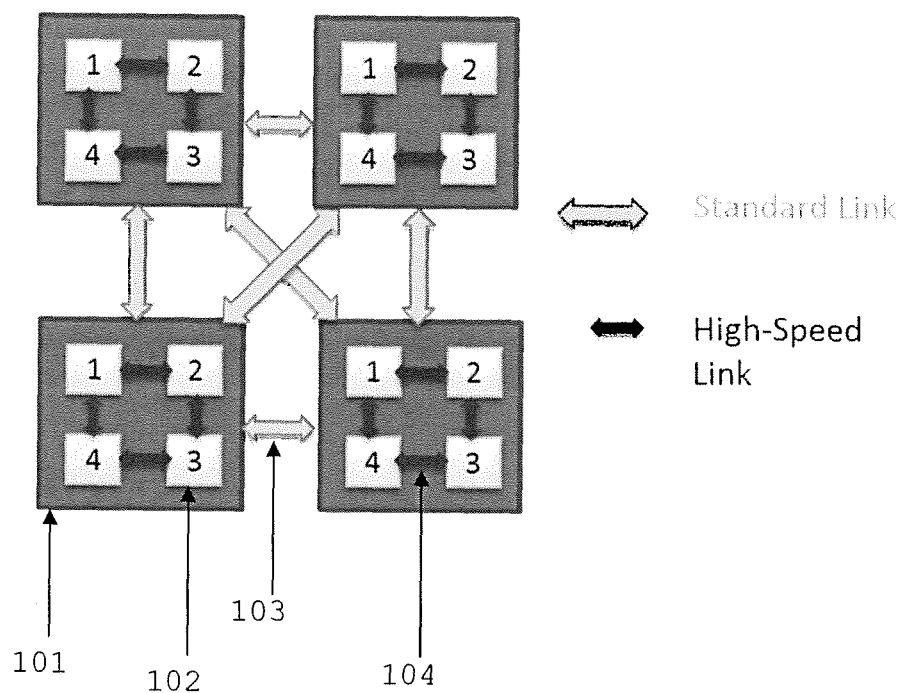
FIG. 1 shows a block diagram of a 4 cluster communication topology.

The communication topology shown in this invention is an asymmetric communication topology, where the distributed systems are composed of clusters and where each cluster contains a small number of devices that are connected by a high-speed communication link. The clusters are connected to each other via standard communication links, e.g., Ethernet switches, which are slower than the local links within the cluster. An example of this topology is illustrated in FIG. 1 with four devices (102) per cluster (101). The numbering of the devices within each cluster refers to the local rank within the cluster. The devices (102) within the cluster (101) are interconnected by high speed communication links (104), while the clusters (101) are interconnected by standard, lower speed links (103).

The bottom-up search requires the knowledge of the status of all neighbors before exploring an unvisited node. In a distributed system, this necessitates the availability of the global bitmap of the whole graph on all devices at the start of each bottom-up iteration.

To reduce the communication overhead, the bitmap communication may be pipelined with the bottom-up execution. In this case, the bottom-up kernel processes the neighbors from one device at a time. The revised distributed bottom-up algorithm becomes:

```
Input: Graph, root
Output: parent array
Mark the root node as visited
While Not all Nodes are Visited
    for every device r
        Receive the bitmap of the next source device
        Send the local bitmap to the next target device
        for every node v in the local subgraph
            if v is not visited
                for every neighbor b of v such that b is owned by r
                    if b is visited
                        mark v as visited
                        set parent[v] = b
                        BREAK
                    endif
                endfor
            endif
        endfor
    endfor
endwhile
```

Every bottom-up step is segmented to N sub steps, where N refers to the total number of devices. At each sub step, only the neighbor nodes that are owned by the corresponding device are inspected. The local bitmap of the nodes on the device of the following sub step is communicated while the current sub step is being processed.

The above procedure does not exploit the difference in the communication throughput in different links, and the number of sub steps, within each bottom-up iteration, equals the total number of devices. In the algorithm shown in this invention, the number of sub steps is reduced to the number of clusters, and all the neighbors that belong to the current cluster are inspected. The algorithm may be summarized as follows:

```
Input: Graph, root
Output: parent array
Mark the root node as visited
While not all Nodes are visited
    Iterate over all clusters starting from local cluster
    Receive the local bitmap from the corresponding device of the
    source cluster
        Send the local bitmap of the current sub step to the
    corresponding device of the target cluster
        Share the local bitmap with local devices in the cluster
            Denote the current source cluster by c
            for every node v in the local subgraph
                if v is not visited
                    for every neighbor b of v such that b is owned
                        by one of the local devices in c
                        if b is visited
                            mark v as visited
                            set parent[v] = b
                            BREAK
                        endif
                    endfor
                endif
            endfor
        end
endwhile
```

In this algorithm, we have two communication levels. The background communication uses the standard communication link. The foreground communication uses the high-speed communication link. During the background communication, each device communicates only with the corresponding device in the previous and following clusters. For example, device 1 in cluster n communicates only with device 1 in clusters n−1 and n+1. During the foreground communication, each device communicates only with the local devices within the cluster. Rather than running the bottom-up kernel for the neighbors from each device, it is run only for the neighbors from each kernel. This effectively reduces the number of sub steps of a bottom-up iteration by a factor equal to the number of devices within a cluster.

Figure 2:
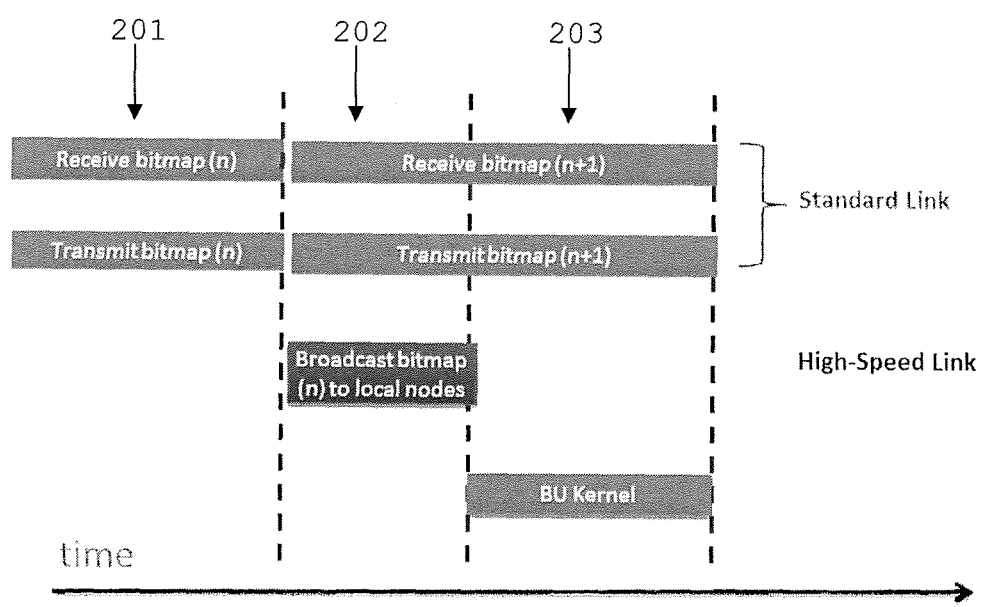
FIG. 2 illustrates a pipelined implementation of the invention.

A timing diagram of a single sub step of the bottom-up iteration is shown in FIG. 2. During time slot 201, a device receives and transmits bitmap n. During time slot 202, the device initiates reception and transmission of bitmap n+1, and broadcasts bitmap n to the local nodes. The devices then execute the BU kernel during time slot 203.

Figure 3:
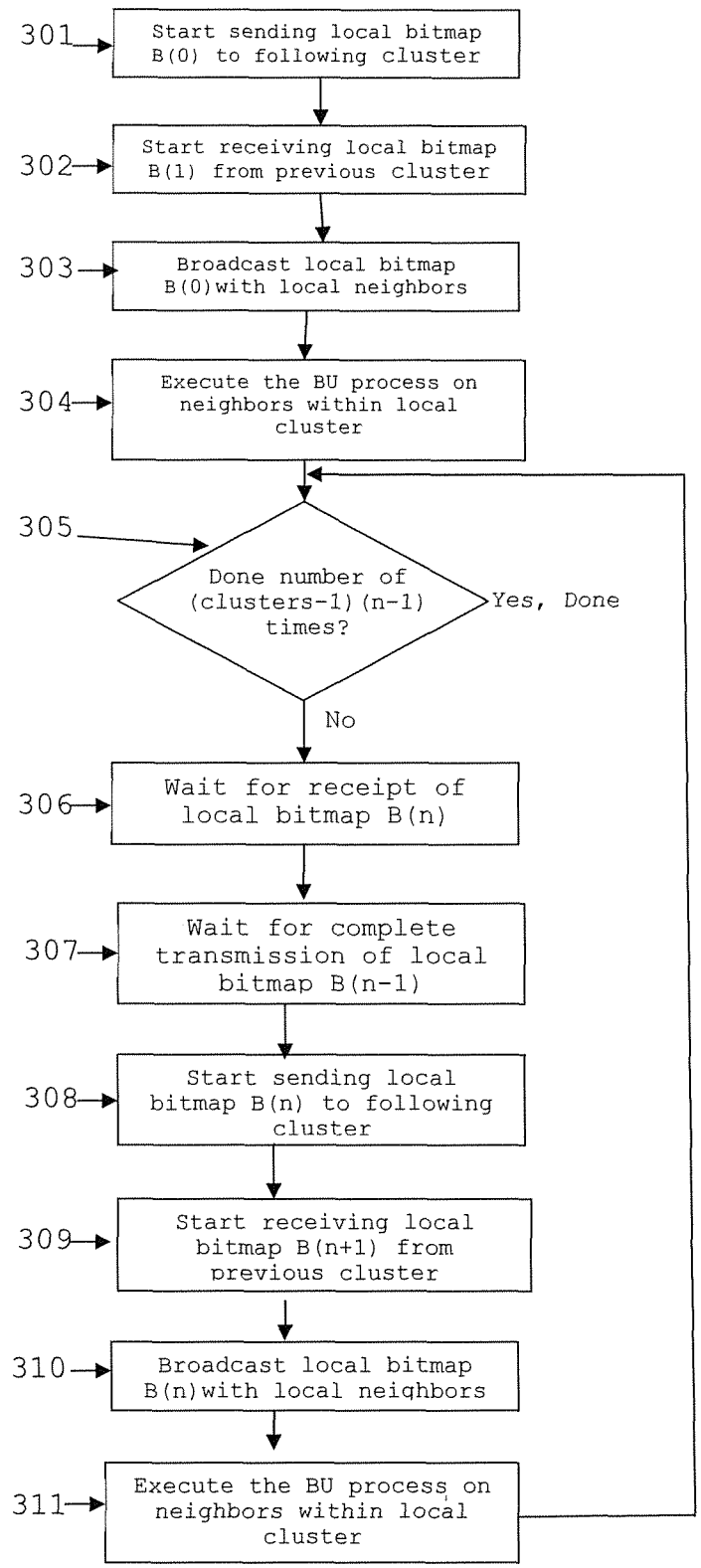
FIG. 3 is a flow chart of the steps involved in the implementation of the invention.

As shown in FIG. 3, the algorithm is executed iteratively until there are no more nodes to discover in the whole graph. Each iteration has a number of sub steps that equals the number of clusters. The execution procedure for each device in a bottom-up (BU) iteration proceeds as follows:
(301) Instantiate a communication process to send the local bitmap B(0) to the corresponding device in the following cluster. This process uses the standard communication link.
(302) Instantiate a communication process to receive the local bitmap B(1) from the corresponding device in the previous cluster. This process uses the standard communication link.
(303) Share the local bitmap B(0) with local neighbors within a cluster through the high-speed communication link. At the end of this stage, the device has all the local bitmaps for its local cluster.
(304) Run the bottom-up kernel procedure to inspect the neighbors that are owned by the local cluster.
(305) Repeat the following steps for a number of time that equals the number of clusters in the distributed systems minus one, because the local cluster is already processed (we use n to indicate the sub step index):
(306) Wait for the communication to complete receiving the local bitmap B(n) for the current sub step from the corresponding device in the previous cluster.
(307) Wait for the communication to complete transmitting the local bitmap B(n−1) to the corresponding device in the following cluster.
(308) Instantiate a new communication process to send the local bitmap B(n) to the corresponding device in the following cluster.
(309) Instantiate a new communication process to receive the local bitmap B(n+1) from the corresponding device in the previous cluster.
(310) Share the local bitmap B(n) with local neighbors within a cluster through the high-speed communication link. At the end of this stage, the device has all the local bitmaps for the current cluster.
(311) Run the bottom-up kernel procedure to inspect the neighbors that are owned by the current cluster.

Figure 4:
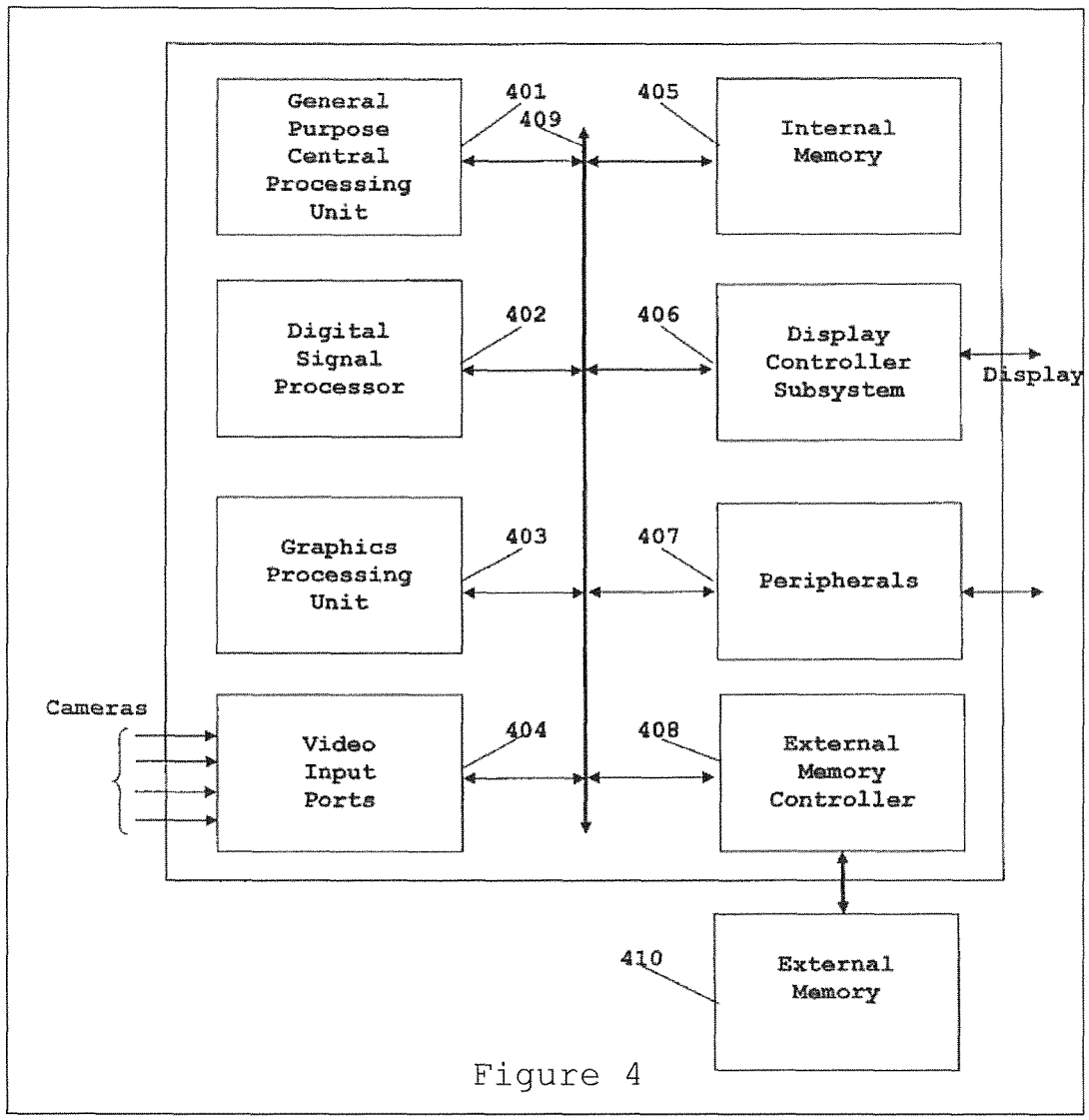
FIG. 4 shows a block diagram of a processor that may be employed to implement the method of this invention.

FIG. 4 shows a processor that may be used to implement the methods of this invention. The processor consists of a general purpose processing unit 401, a digital signal processor 402, a graphics processing unit 403, one or more video output ports 404, internal memory 405, a display controller subsystem 406, one or more peripherals 407, an external memory controller 408, and external memory 410. These system blocks are operable to communicate through bus 409.

What is claimed is:
1. A distributed computing system comprising:
    n clusters, wherein n is an integer greater than 1, and wherein each cluster of the n clusters is communicatively coupled to every other one of the n clusters by a first type of communication link;
    x discrete devices distributed amongst the n clusters so that each cluster includes an equal number of the discrete devices, wherein x is an integer greater than n, wherein the discrete devices within each cluster are communicatively coupled to each other by a second type of communication link, and wherein each of the x discrete devices represents a node in a graph of the distributed system;
    wherein the distributed computing system is configured to perform a traversal of the graph of the distributed system by:
        performing a bitmap reception and transmission process n times, the bitmap reception and transmission process including:
            for each cluster, causing each discrete device of the cluster to receive a bitmap sent by a respective one the discrete devices of another one of the clusters and to broadcast the received bitmap to all other discrete devices of the cluster, and causing each discrete device of the cluster to transmit a bitmap other than the received bitmap to another one of the clusters, wherein the cluster from which the received bitmap is sent differs from the cluster to which that transmitted bitmap is sent;

wherein the received bitmap corresponds to a different cluster each of the n times the bitmap reception and transmission process is performed;

wherein the transmitted bitmap corresponds to a different cluster each of the n times the bitmap reception and transmission process is performed; and wherein, after the bitmap reception and transmission is performed n times, every discrete device has a bitmap of every other one of the discrete devices; and performing a bottom up search on each discrete device of each cluster during each of the n times the bitmap reception and transmission is performed.

2. The distributed computing system of claim 1, wherein the second type of communication link supports a faster communication speed than the first type of communication link.

3. The distributed computing system of claim 2, wherein the broadcasting of the received bitmap to all other discrete devices of the cluster is performed using the second type of communication link.

4. The distributed computing system of claim 1, wherein n is equal to 4.

5. The distributed computing system of claim 1, wherein x is an integer multiple m of n and each cluster includes m discrete devices.

6. The distributed computing system of claim 1, wherein n is equal to 4 and x is equal to 16 and each cluster includes 4 discrete devices.

7. The distributed computing system of claim 1, wherein the bottom up search is performed by:
receiving a root node of the graph;
marking the root node as visited;
while unvisited nodes are present in the graph, for each discrete device:
for each unvisited node of a local subgraph of the discrete device, determining whether any neighboring node that is part of a same cluster as the discrete device is visited and, if at least one neighboring node that is part of the same cluster as the discrete device is visited, marking the unvisited node of the local subgraph as visited.

8. The distributed computing system of claim 1, wherein, in one of the n times the bitmap reception and transmission is performed, the transmitted bitmap corresponds to the cluster that receives the received bitmap.

9. The distributed computing system of claim 8, wherein, in the remaining n−1 times the bitmap reception and transmission is performed, the transmitted bitmap corresponds to a cluster other than the cluster that receives the received bitmap.

* * * * *